Jan. 3, 1939.  H. L. OLIVE  2,142,081
GREASE GUN
Filed Oct. 3, 1936  4 Sheets-Sheet 2
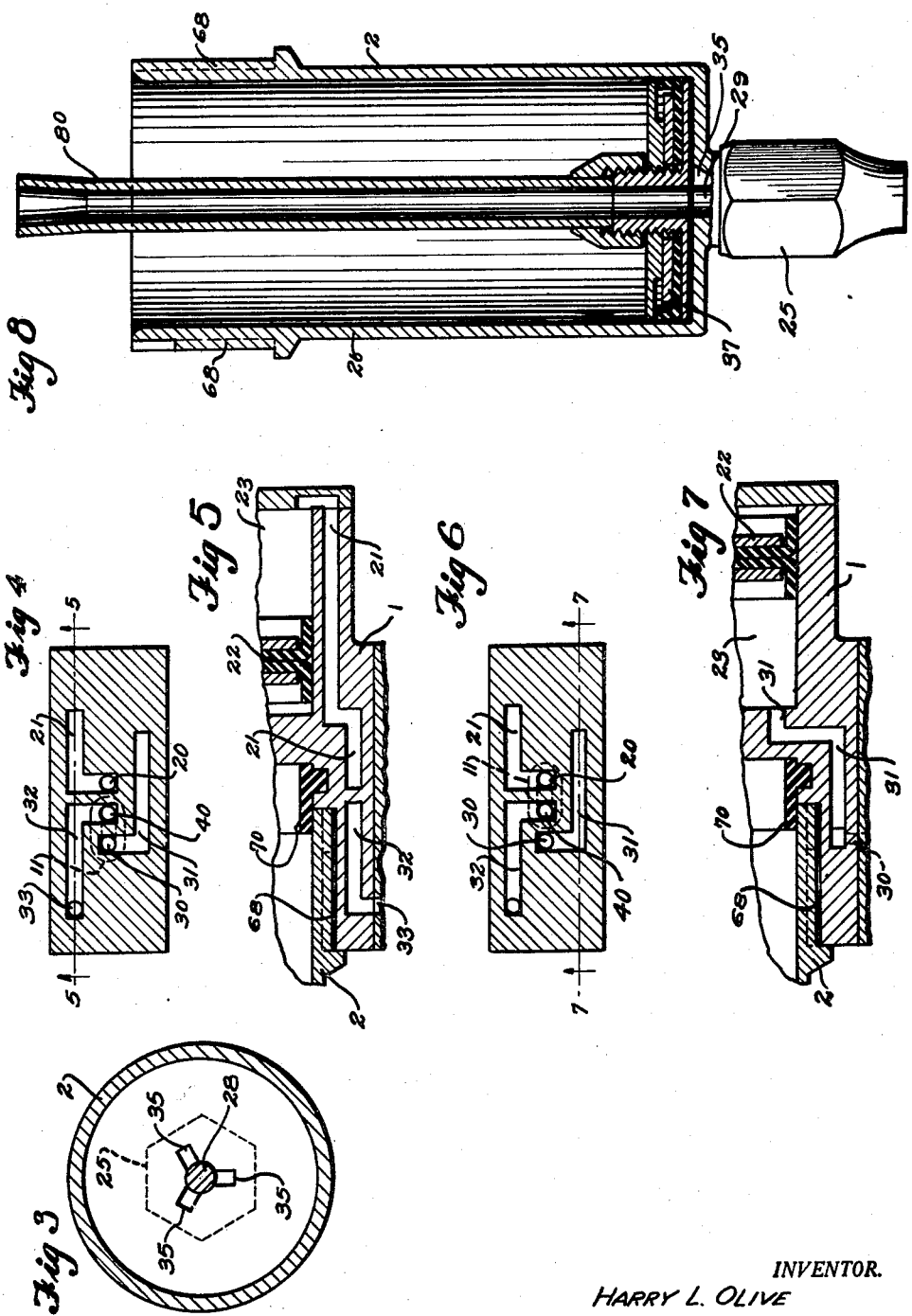
INVENTOR.
HARRY L. OLIVE
BY
Cook & Robinson ATTORNEYS.

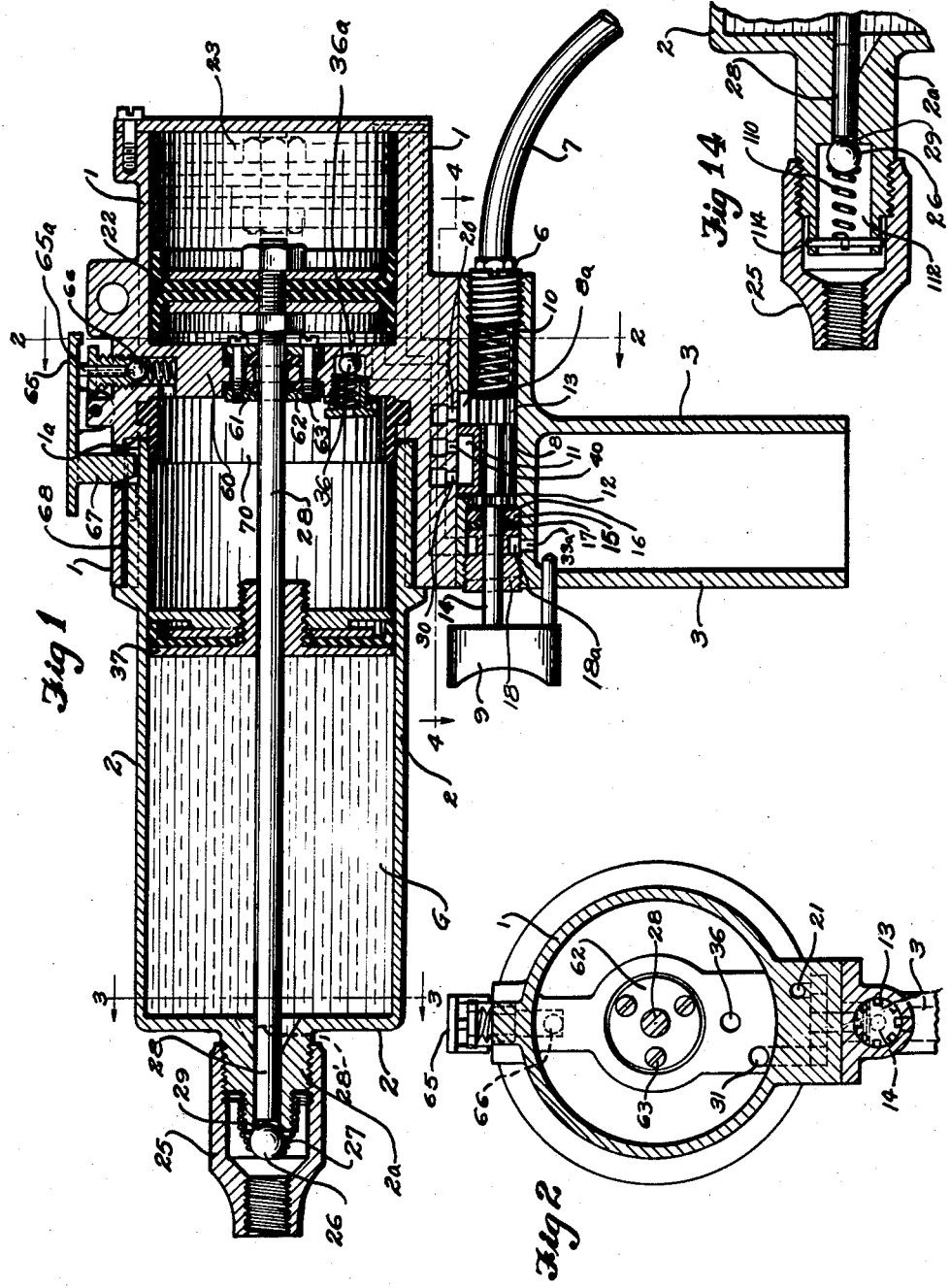

Jan. 3, 1939.   H. L. OLIVE   2,142,081
GREASE GUN
Filed Oct. 3, 1936   4 Sheets-Sheet 3
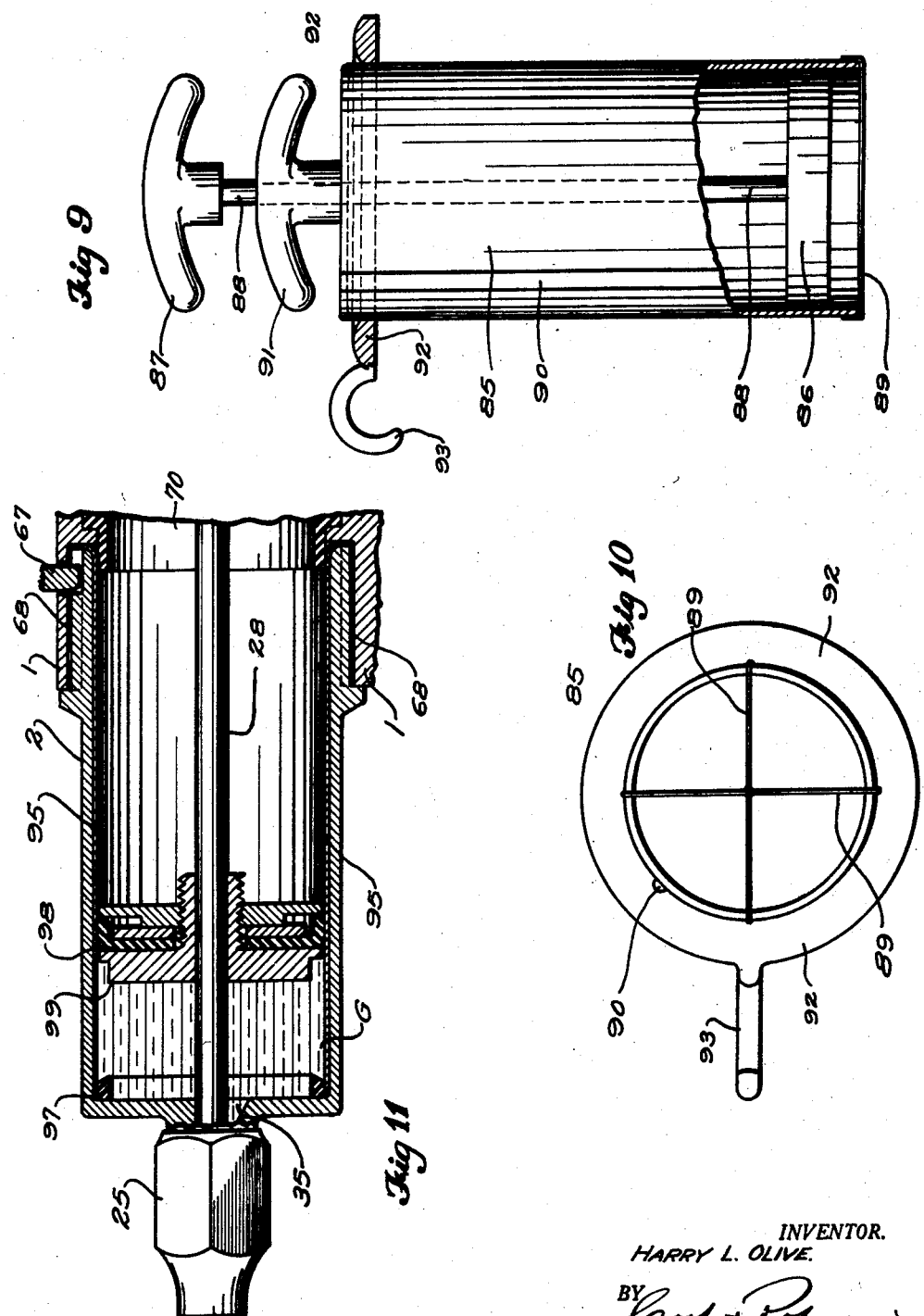
INVENTOR.
HARRY L. OLIVE.
BY Cook & Robinson
ATTORNEYS.

Jan. 3, 1939.  H. L. OLIVE  2,142,081
GREASE GUN
Filed Oct. 3, 1936   4 Sheets-Sheet 4
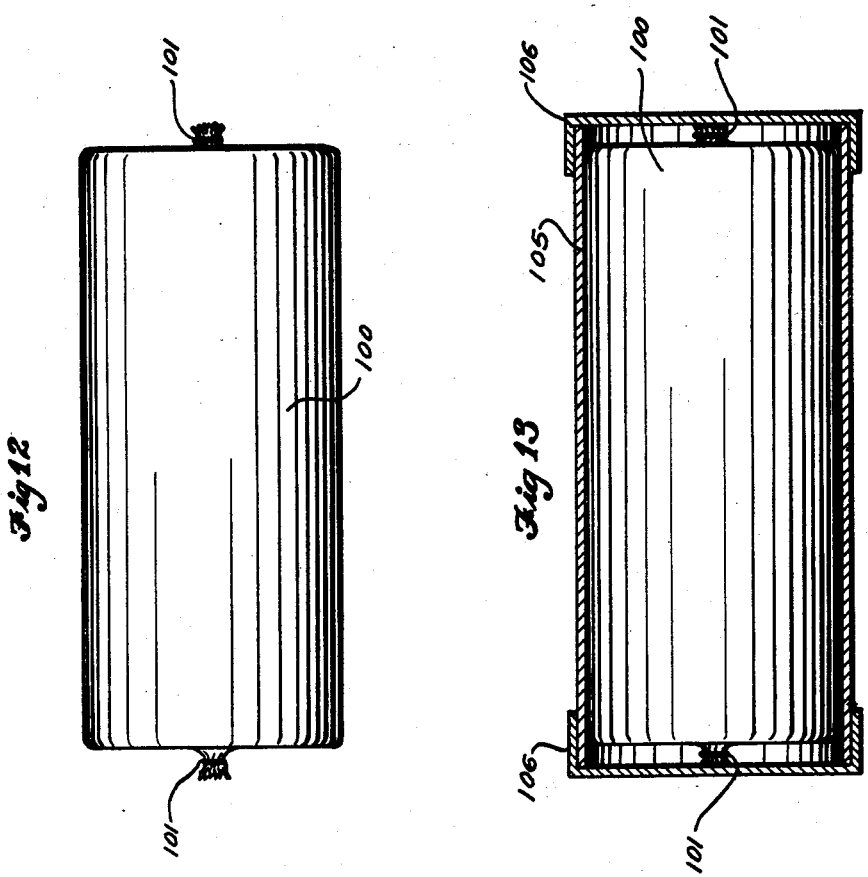
INVENTOR.
HARRY L. OLIVE
BY
Cook + Robinson ATTORNEYS.

Patented Jan. 3, 1939

2,142,081

UNITED STATES PATENT OFFICE 2,142,081

GREASE GUN

Harry L. Olive, Seattle, Wash.

Application October 3, 1936, Serial No. 103,892

8 Claims. (Cl. 221—47.3)

This invention relates to pneumatic lubricating guns and more particularly to a pneumatic oil or grease gun wherein provision is made for a large quantity injection at low pressure and also for small quantity injection at high pressures.

It is the principal object of this invention to provide a pneumatic oil or grease gun of the character above stated and adapted for the interchangeable use therewith of oil or grease magazines; also, to provide a grease gun equipped with a one-piece, high pressure ram arrangement for operating directly through the selected grease magazine and eliminating the necessity of valves, valve stems, valve springs and delivery tubes, which, as used in the ordinary types of grease guns, hinder the passage of oils or greases.

It is also an object of the invention to provide a grease gun having such features of design as to accommodate it for the use therein of a highly viscous or fibrous grease in large quantities, quickly at low pressure, and in small quantities at high pressure.

It is also an object of the invention to provide a grease gun arranged for an easy and quick interchange of magazines containing greases or oils of different kinds and in a manner whereby to prevent the grease from one magazine becoming mixed with, or in any way becoming contaminated by the grease of another magazine incident to changing magazines, thereby avoiding the usual procedure of emptying and cleaning the magazine when a change of oil or grease is necessary.

It is also an object of this invention to provide grease magazines of a character that may be easily cleaned and refilled, and wherein each has a self-sealing breech lock and release mechanism providing for a simple mode of assembly with the gun and eliminating the necessity of making any adjustments incident to assembling.

Still another object of the invention is to provide a grease gun and magazine wherein the operating air does not come directly in contact, or intermingle with the grease, but forces the lubricant to its desired points of use by acting against a floating piston, which, in turn, acts against the grease supply at all times.

A further object of the invention is to provide a grease gun of an "in-line" arrangement of parts, minimizing wear or strain to mechanical parts and wherein all valves, packing glands and pistons that are employed are of such a character as to need no mechanical adjustment from time to time.

Still another object of the invention resides in the provision of a floating piston for each grease magazine, the forward ends of which conform to the inside contour of their respective magazines so as to provide for complete ejection of all of the oil or grease from the magazine incident to the piston being actuated to its extreme ejecting position.

In accomplishing the above and other objects of the invention, I have provided the improved details of construction, the preferred forms of which are illustrated in the accompanying drawings, wherein—

Fig. 1 is a sectional view in an axial plane of the gun, particularly illustrating the removable grease magazine and the grease ejecting pistons.

Fig. 2 is a cross section on the line 2—2 in Fig. 1.

Fig. 3 is a cross section on the line 3—3 in Fig. 1.

Fig. 4 is a horizontal section on the line 4—4 in Fig. 1, indicating in dotted lines the normal position of the control valve.

Fig. 5 is a view on the line 5—5 in Fig. 4, showing the air passage leading to the outside of the ram actuating piston.

Fig. 6 is a view of the parts shown in Fig. 4, but indicating the valve in its secondary, or operating position.

Fig. 7 is a view on the line 7—7 in Fig. 6 showing the air passage to the front of the ram actuating piston.

Fig. 8 is a longitudinal section of a grease magazine or cartridge, showing a fitting for removing the floating piston, and also for use in refilling the magazine.

Fig. 9 is a side view of a reloading pump for use in filling a grease magazine.

Fig. 10 is an end view of the pump illustrated in Fig. 9.

Fig. 11 is an illustration of an alternative construction of the grease magazine, adapted for application to a refillable grease cartridge.

Fig. 12 is a view of a grease containing package.

Fig. 13 is a view showing the package as applied within a shipping carton.

Fig. 14 is a sectional detail of a check valve of an alternative construction.

Referring more in detail to the drawings—

The grease gun embodied in this invention, in its preferred form of construction, comprises a cylindrical body portion 1, which removably mounts a grease containing magazine 2, also of cylindrical form. The body 1 is mounted upon a handle member 3, on which the weight of the device is substantially balanced, thus to facilitate the handling and operating of the device.

Formed horizontally in the upper portion of the handle member 3 is a valve chamber 8, and connected with one end of this chamber, through the mediacy of a nipple 6, is an air hose 7 which leads from a source of air under constant pressure, not shown. The valve chamber is of cylindrical form, and is longitudinally slotted in its upper or top wall, as at 8a, and this slot contains therein a slidable valve block 11. The valve block is engaged at its opposite ends by pistons 12 and 13 that are fixed on the stem or rod 14 of a trigger member 9, and there is a coiled spring 10 contained in the cylinder between the nipple 6 and the piston 13 to act against the latter in a manner normally to hold the trigger in the extended position as illustrated in Fig. 1.

The peripheral surfaces of the pistons 12 and 13 are transversely grooved, thereby to allow a free passage of air past them for a purpose presently understood. Also, the trigger stem 14 passes through a packing gland which seals the end of the chamber opposite that with which the hose 7 is connected. This gland consists of a washer 15 which surrounds the stem, and which is abutted against an annular shoulder 16 in the cylinder 8, and a leather packing 17 against which a packing nut 18 is threaded.

Formed in the base portion of the body 1, at spaced intervals and alined with the axis of the chamber 8 are three valve ports, designated respectively by the reference numerals 20, 40 and 30. These ports all communicate with the slot 8a and respectively with passages 21, 32 and 31, as will best be understood by reference to Figs. 4 and 6. The passage 21 leads within the wall of the housing 1, and opens, as seen in Fig. 5, into the outer end of a closed air cylinder 30 formed in the housing 1. The passage 32 leads forwardly within the wall of housing 1 and opens therefrom downwardly into the forward end of chamber 8, through an opening 33, and into an annular passage 18a formed about the packing nut 18. This passage 18a, as will be understood by reference to Fig. 1, communicates with atmosphere through a port 33a in the hollow handle 3. The passage 31 leads within the wall of the housing 1 into the cylinder 23 at the inner end thereof.

In the normal position of the valve block 11, the air delivered under pressure through the tube 7 into the cylinder 8 flows from the cylinder 8 through the port 20 along the passage 21 to the outer side of a piston 22 that is slidably fitted in the chamber, or air cylinder, 23. This actuates the piston 22 inwardly, as from the dotted line position of Fig. 1 to the full line position.

The grease containing magazine 2 consists of a cylinder having an open inner end that is applied removably within a socket in the housing 1, which is designed to receive it. The connection will later be more fully described. At its outer end, the magazine is closed by a wall equipped with an adapter 25, to which may be connected a pipe, tube or other device, necessary for the regular lubricating operations.

The adapter 25 is threaded onto a nipple 2a which is extended centrally from the end wall of the magazine, and this nipple has a cylindrical bore 29 that is coaxial with the magazine 2, and in this bore is slidably fitted one end of a ram 28 which, at its opposite end, is fixed to the piston 22 which is slidably contained in the air cylinder 23.

It will here be mentioned that when the piston 22 is in its outer position, as indicated by the dotted line showing in Fig. 1, the end of the ram 28 extends just slightly within the cylindrical bore 29, as to the dotted line showing 28' in Fig. 1. Also, when the piston 22 is actuated to its inner limit, the outer end of the ram 28 is contained just slightly within the outer end of the cylindrical bore 29.

As will be observed by reference to Figs. 1 and 3, there are a plurality of passages 35 opening from the inner end of the cylinder 29 to the interior of the cylinder 2, and these are uncovered by the ram when it is in its retracted, or innermost position.

Inside the adapter 25 is a ball back check valve 26 that is held in position over the outer end of the bore 29 by means of a coiled spring 27 that is applied to a threaded extension of the magazine 2. This check valve prevents the grease, after being ejected by the ram, from being drawn back into the cylinder 29 when the ram is retracted; it being understood that, when the ram is retracted, a partial vacuum will be created in the outer end of the cylinder 29.

When the grease gun is to be operated for the ejection of grease from the magazine 2, the trigger 9 is depressed by the operator so as to move the valve block 11 from the position shown in Fig. 4 to that indicated in Fig. 6. This movement uncovers the air port 30, and air under pressure passes through the channel 31 into the inner end of the cylinder 23 to move the piston 22 to the outer position in the cylinder 23. As the piston 22 moves to this position, air from the outer end of the cylinder 23 is exhausted through the channel 21, port 20, through the valve block 11, and thence through port 40, channel 32, air port 33, and port 33a. With this movement of the piston 23, the end of the ram 28 is moved back to the position indicated by the dotted line 28' in Fig. 1, thus allowing open communication through the passages 35 between the magazine and the cylinder 29.

The grease G contained in cylinder 2 is confined between the outer end wall of the magazine and a freely floating piston 37 fitted in the magazine, and which has a central bearing through which the rod 28 is slidably fitted.

It will be observed also by reference to Fig. 1 that the inner end wall of cylinder 23 has a port 36a providing communication between the cylinder 23 and the open end of magazine cylinder 2. This port is equipped with a back check ball valve 36 or equivalent arranged to prevent return flow of air into the cylinder 23.

It is obvious that when the ports 35 are uncovered by the retraction of the ram, the grease will be permitted to flow into the high pressure cylinder 29 by reason of the sustained pressure and by a subsequent application of additional pressure to the floating piston 37, as will presently be described.

When the piston 22 has been actuated to the outer end of the cylinder 23, the air pressure then builds up at the inside of the piston and opens the valve 36 past which it flows into the grease magazine 2, thus acting against the floating piston 37 to move it outwardly with a resultant ejection of grease at what is termed the low pressure discharge.

As long as the trigger 9 is depressed, lubrication by this low pressure ejection continues, and when the desired amount of grease has been ejected, the operator releases the trigger and the spring 10 moves it back to normal position. Incident to this release of the trigger, there will be a high pressure ejection of the small amount of grease that is contained in the cylinder 29. The reason for this high pressure ejection is that when the valve 11 moves back to normal position, it uncovers the port 20 and allows the air pressure to act directly against the outer side of the piston 22, thus to return it quickly to its inner position, thus moving the ram to eject the material contained in the cylinder 29.

In instances where the lubricant is applied through open or free-running channels, such as in the universal housing, wheel bearings, or the steering gears of an automobile, it is essential that the grease be delivered in large quantities, quickly, but at low pressure; it being understood that continued high pressure might cause damage to these parts.

In instances where lubrication is to be applied through choked, clogged or sluggish channels, the high pressure ejection is desirable to force the flow of the lubricant. Therefore, when the trigger 9 is released and allowed to move forward by reason of the spring 10, the valve stem 14 moves forwardly and the grooved pistons 12 and 13 actuate the valve 11 back to its normal position, thereby opening the air port 20 and at the same time connecting the ports 30 and 40 to permit the exhaustion of air from the cylinder 23 at the inside of the piston. For repeated high pressure lubrication, the trigger 9 repeatedly is depressed and released, thereby effecting quick reciprocal movements of the ram, which discharges lubricant with great pressure from the cylinder 29. Consequently, the ram 28 is held in its extended position in the high pressure cylinder 29, thus sealing the magazine 2 against any possible leakage or loss of grease, and since the gun is pneumatically operated without the use of springs, variations or interruptions on the air pressure will in no way cause leakage or loss of the grease contents of the gun while it is idle, nor interfere or interrupt the efficiency, service, or use of the gun whatsoever.

It will here be stated that the piston 22 is constructed of two conventionally formed piston leathers 50 and 51 in reversed relation to each other; both leathers having an expanding washer 52 adjacent their inside surfaces to insure a tight fit against the cylinder wall at all times. Also, it will be stated that the hat packings in the packing gland in the wall 60 that separates the air cylinder from the grease magazine compartment are so constructed that they need no attention whatsoever after being once assembled. A hole is countersunk on each side of the wall 60 to receive the leather washers 61, one on each side, since the ram 28 operates in both directions with air pressure on both sides, held in place by a washer 62, and the whole assembly of the packing gland being held in position by screws 63 passing through the entire assembly and being threaded into the outer washer 62. All moving ports are sealed against loss of air or grease automatically and without use of pressure packings.

For quick and easy application of the magazine 2 to the housing 1, the housing is provided with a cylindrical socket to receive the end of the magazine therein up against an annular encircling shoulder 1a, as will be noted in Fig. 1. The inner wall surface of the housing socket and the outer wall surface of the magazine are provided respectively with interengaging lugs 68 adapted to be interlocked when the magazine is inserted to its limit and slightly rotated relative to the housing. To insure a non-leaking connection, a synthetic rubber sealing gasket 70 is fitted within the base of the housing socket in such position as to overlap with the inner end of the magazine in a manner whereby air pressure inside the magazine will press the gasket against the wall surface and facilitate the sealing.

When the parts are in assembled relation, they are locked by means of a latch member 67. This is carried by a latch plate 65 that is pivotally mounted on the housing 1, as shown in Fig. 1, in a manner allowing the latch 67 to enter through a port in the housing and extend into holding contact with a lug on the magazine 2, whereby rotation of the parts and unlocking are prevented.

It will also be observed that the housing 1 is equipped with a spring supported exhaust valve 66 operable to effect a discharge of air from the inner end of the magazine by the depressing of the latch plate 65; there being a valve unseating pin 65a fixed to the plate, as will be understood by reference to Fig. 1.

When it is desired to remove the grease magazine 2, the thumb lever 65 is pressed down, opening valve 66 and allowing the air under pressure in the grease magazine cylinder 2 to escape. The movement of this thumb lever 65 also lifts the latch 67 to free the breech lock 68 so that the magazine may be revolved and removed. It is immaterial whether or not the grease magazine is empty insofar as removing it is concerned. If grease remains in the magazine, the ram 28 is wiped free from any of this grease by the floating piston 37, except for a small amount that may adhere to the very end of ram 28, and which is easily removed before replacing another grease magazine in place of the original one. As the ram 28 is removed from the grease cylinder, the grease fills in behind it as it is moved back, because there is no way for air to enter the magazine, and consequently the floating piston will be moved forward a very small amount. Because of its importance in the provision of thoroughly consistent positive and immediate lubrication, stress is laid on this point: That, under no condition does any air enter into the grease magazine in front of the floating piston 37, and in so doing form air pockets or bubbles in the grease.

To assemble the gun proper and the grease magazine, it is simply a matter of placing the ram 28 through the hole in floating piston 37 and subsequently into the high pressure cylinder 29; this being quickly and easily done. The grease magazine 2 is rotated so that the breech lock is brought into locking register and the gun is ready to operate; the catch 67 snapping automatically into place. The rubber sealing ring 70, preferably made of synthetic rubber, because of its grease resisting properties, is easily removable or replaceable because of its simplicity of design, and automatically seals the air chamber of grease magazine 2 against air leakage when the magazine 2 is assembled with the gun proper.

It will be seen that the rubber sealing ring 70 overlaps the end of the grease magazine sufficiently that any increase of air pressure beyond normal atmospheric pressure will cause this rubber to be pressed outwardly, resulting in a securely air tight seal at this point.

It will be here stated that by high pressure is meant the application of line pressure, or that which is termed low pressure, to the rearward side of piston 23 and applied through the ram 28, which is relatively of much smaller cross sectional area, to the grease in the cylinder 29 in the forward end of grease container 2. By stepping up the ratio of the pressure in this manner, say a 75 to 1 ratio, as the case is at present, a high pressure lubrication is assured and can be appreciated, especially when a line pressure, or low pressure lubrication, of 50 to 175 pounds in air pressure is used. Since it is the simplest direct route that the grease follows in its advance from the grease magazine 2 into the high pressure cylinder 29, and since that route is also free of the valves, valve stems, valve springs or delivery tubes as in grease guns in use previous to this invention, it is possible to use greases of high viscous or fibrous character with ease at low pressure.

It might be stated that when the grease is once delivered to the high pressure cylinder 29, its delivery to its necessary points is but a simple matter through the high pressure lubricating means of the gun. The same magazine and floating piston may be used for all kinds and qualities of oils and greases with no change of mechanical parts whatsoever.

By reference to Fig. 8, means for refilling the grease magazine or removing the floating piston is illustrated. To refill the magazine, the nozzle of a suitable grease or oil pump is inserted in the upper end of tube 80 and grease or oil then pumped into the magazine. As the grease magazine is being filled, the floating piston 37 moves toward the top of the magazine, and as much grease as desired is used.

It is a feature of this invention that only one of these grease guns be necessary with, of course, as many grease magazines as are necessary to accomplish the various lubricating needs.

When a magazine is to be refilled with a heavy grease, it is preferred to use a refilling pump of the type illustrated in Fig. 9. This particular pump comprises a cylindrical shell 85 open at one end and closed at its opposite end, and containing therein a plunger or piston 86 to be operated by a stem 88 extended through the closed end of the cylinder and equipped at its outer end with a handle 87. Across the open end of the cylinder 85 are taut wires 89. To fill this cylinder 85, its opposite end is pressed downwardly into the grease in such manner that the grease will move the piston 86 up to the closed end of the cylinder and entirely fill the cylinder. Then the cylinder 85 is slightly rotated by means of a handle 91 affixed to its upper end thereby causing a longitudinal rib 90 on the outer surface of the cylinder to open up an air passage to the lower end of the cylinder. Rotation of the cylinder also causes the wires 89 to separate the grease inside the cylinder from that outside of it. Then, when the cylinder is withdrawn, it retains a full charge of grease. By placing the open end of the cylinder 85 inside the open end and to the bottom of the magazine to exclude the air, and moving the piston 86 inwardly a charge of grease will be transferred from the cylinder 85 into the magazine 2.

A metal ring 92 surrounds the cylinder and is longitudinally slidable thereon. This ring is equipped with a hook 93 for suspending the device when it is not in use, and the ring operates also as a means whereby the outer surface of the cylinder may be wiped clean of grease that might cling thereto when it is withdrawn from the grease supply from which it is loaded.

In Fig. 11, I have illustrated an alternative form of magazine adapted to receive a refillable grease cartridge. The cartridge 95 comprises a thin metal cylinder with a flanged end 96 adapted to fit snugly within the grease magazine 2. Cartridges of this type may be filled and stored ready for immediate insertion, and in this way minimize the delay usually encountered in refilling operations. When a cartridge 95 is inserted into a magazine, a synthetic sealing ring 97, which is fitted in the closed end of the magazine, effects a seal whereby grease will be prevented from being forced into this space between the cartridge and the magazine wall. A floating piston 98 of the same general character as the piston 37 is applied within the cartridge. This differs from the piston 37 only in that it has a shouldered forward surface, as at 99, which adapts it to travel past the gasket 97 to the end of the magazine.

Provision is also made for charging the grease magazine 2 with a grease package, as at 100 in Fig. 12, which consists of a Cellophane wrapper, or similar thin suitable material. This Cellophane wrapper, having one end tied, as at 101, is filled, and then the other end tied also, and may then be shipped, stored and otherwise handled in the cardboard or fibre container 105, as in Fig. 13. This container 105 is necessarily cylindrical, so as to maintain the shape of the packaged grease.

When loading the grease magazine with such a charge of grease, the floating piston 37 must be removed from the magazine, the caps 106 removed from the ends of the container 105, the forward end of the wrapper cut and removed, and the package forced from the container into the magazine 2 of the grease gun. The rearward end of the wrapper may also be removed, or the plunger 28 may be forced through it, and the grease gun and magazine assembled in the same manner as previously described.

By keeping these grease packages of a size that fits snugly inside of the magazine 2, the air is excluded and there are no bubbles or air pockets. Upon operation, the wrapper is forced toward the forward end of the magazine 2 of the gun, remaining adjacent to the walls of the cylinder, and all of the grease is excluded from the magazine 2 as it is in the other methods of loading. The empty wrapper is easily removed, and another inserted, and the gun is ready for use again.

An alternative type of check valve in the extended portion 2a of magazine 2 is illustrated in Fig. 14. The valve ball 26 is held in place in this instance by a spring 110 inside of chamber 112 in the extended portion 2a of magazine 2. The spring 110 is held by having one end of it extended through a hole in a pin 114. The pin 114 is pressed in holes in the end of this nipple 2a, which is of a slightly smaller diameter than the threads thereon, so as to facilitate assembly. This chamber 112 is of such a size that the area between the outside of the ball 26 and the inside walls of said chamber is equal to or larger than the area of the high pressure chamber 29. It is readily appreciated that by such a construction, there will be an even, unhindered flow of grease from the gun, by reason of hydraulic principles. This type of check valve is particularly advantageous in operations where a heavy viscous or fibrous grease is used entirely from the magazine.

It is desired that the claims shall not be limited to these particular details, but that they be given an interpretation commensurate to the scope and spirit of the invention.

Having thus described my invention, what I claim as new therein and desire to secure by Letters Patent is—

1. A grease gun comprising a grease containing cylinder having a discharge passage at its outer end, a grease ejecting piston fitted in the cylinder and providing an air chamber at the inner end thereof, a closed air cylinder associated with the grease cylinder and having a piston movable therein, a rod extended from the latter piston to a position to control the opening and closing of the said discharge passage; said air cylinder, at one end, having a connecting passage with said air chamber, a back check valve in said connecting passage, a valve housing, having channels to opposite ends of the air cylinder, a source of air under pressure connected with the housing, and a control valve in said housing movable from normal position for admittance of air pressure to one end of the air cylinder to move its piston and rod to open the discharge passage of the grease cylinder and to effect an application of air pressure past the back check valve into the grease cylinder to move the piston therein for an ejection of grease through said discharge passage.

2. A device as in claim 1, wherein a means is provided to cause a return of the said control valve to normal position whereby to effect an application of air pressure to the other end of the air cylinder, thereby to move the piston therein and cause its rod to close the discharge passage of the grease cylinder.

3. A device as in claim 1, wherein, a return of the control valve to normal position effects an application of air pressure to the other end of the air cylinder, to move the piston therein and cause its rod to effect the closing of the discharge passage and wherein the discharge passage of the grease cylinder forms a high pressure cylinder, and said piston rod is arranged to move thereinto in its closing action, thereby to effect a high pressure ejection of grease from the passage.

4. A device as in claim 1 wherein the air cylinder has an open socket at one end and the grease cylinder is removably fitted at one end in said socket and interlocked therewith for ready disconnection, and wherein a flexible sealing gasket is fitted inside the socket to overlap the cylinder and to effect an air sealed joint.

5. A grease gun comprising a grease containing cylinder having a grease discharge passage at its outer end, a floating, grease ejecting piston in the cylinder setting off an air chamber at the inner end thereof, a closed air cylinder, a piston movable therein having a rod extending through the grease cylinder to operate, in one position of the piston, as a closure for the said outlet; said air cylinder having a connecting passage at one end with the air chamber, a back check valve in said passage, a source of air under pressure, and a control valve mechanism normally providing connection between the source of air and one end of the air cylinder whereby the piston in the latter is held in position that its rod closes the discharge passage, and movable to operating position to relieve air pressure from that end of the cylinder and to apply it to the opposite end, thereby to move the piston to retract the rod from the discharge passage, and to cause a flow of air past the said back check valve into the grease cylinder to actuate the first mentioned piston to eject grease at low pressure; said valve, on its return to normal position, effecting application of air into the air cylinder to return its piston to initial position, and thereby to effect a high pressure ejection of the grease from the discharge passage by the entrance of the rod thereinto.

6. A grease gun comprising a housing forming a closed air cylinder and having a socket at one end, a grease cylinder closed at its outer end and having an open inner end fitted within the socket thereby to be closed; the walls of the socket and cylinder having parts adapted to be interlocked thereby to hold them functionally connected; said grease magazine having a discharge bore in its outer end, a grease ejecting piston fitted in the grease cylinder, a piston in the air cylinder having a rod extending longitudinally of the grease cylinder through the grease ejecting piston and into said discharge bore, a handle on the housing, a valve cylinder therein having connecting passages into opposite ends of the air cylinder and to atmosphere; said air and grease cylinders having a connecting air channel; a source of air under pressure connected with the said valve housing and a valve member movable in said housing from normal to operating position whereby air pressure is admitted to one end of the air cylinder, first to move the piston therein and rod to a position to open the discharge bore, then to advance the grease ejection piston to effect the discharge of grease at low pressure, and movable back to normal position to effect application of air to the other end of the air cylinder whereby the piston therein is actuated to move the piston rod into the discharge bore to effect ejection of grease therefrom at high pressure.

7. A device as in claim 6 wherein a movable latch device is provided for normally holding the grease cylinder and air cylinder functionally interlocked, and wherein the air chamber of the grease cylinder has an air pressure relief valve adapted to be opened by a releasing action of said latch.

8. In a grease gun, a cylinder, an open end cartridge fitted therein, a sealing gasket fitted in the cylinder and overlapping the inner end of the cartridge, a flexible sealing gasket fitted inside the outer end of the cartridge to seal the joint with the outer end wall of the cylinder and having a part thereof interiorly overlapped with the cartridge and adapted to be forced against the joint by an application of pressure within the cartridge.

HARRY L. OLIVE.